(12) United States Patent
Ahn et al.

(10) Patent No.: US 12,257,210 B2
(45) Date of Patent: Mar. 25, 2025

(54) CONTAINER WHICH ACCOMMODATES DRUG AND IS SEALED

(71) Applicant: CHO-A PHARM CO., LTD., Seoul (KR)

(72) Inventors: Cheol Soo Ahn, Changwon-si (KR); Sang Uk Park, Changwon-si (KR); Sung Hoan Cho, Seoul (KR)

(73) Assignee: CHO-A PHARM CO., LTD., Seoul (KR)

( * ) Notice: Subject to any disclaimer, the term of this patent is extended or adjusted under 35 U.S.C. 154(b) by 471 days.

(21) Appl. No.: 17/427,562

(22) PCT Filed: Mar. 8, 2020

(86) PCT No.: PCT/KR2020/003216
§ 371 (c)(1),
(2) Date: Jul. 30, 2021

(87) PCT Pub. No.: WO2020/189934
PCT Pub. Date: Sep. 24, 2020

(65) Prior Publication Data
US 2022/0133591 A1    May 5, 2022

(30) Foreign Application Priority Data
Mar. 19, 2019   (KR) .......................... 10-2019-0030860

(51) Int. Cl.
*A61J 1/06* (2006.01)
*A61J 1/14* (2023.01)
(Continued)

(52) U.S. Cl.
CPC .............. *A61J 1/06* (2013.01); *A61J 1/1412* (2013.01); *A61J 1/1475* (2013.01); *B29D 22/003* (2013.01); *C03B 19/025* (2013.01)

(58) Field of Classification Search
CPC .... B65B 7/2807; B65B 3/003; A61M 39/221; A61J 1/1412; A61J 1/05; A61J 1/06
(Continued)

(56) References Cited

U.S. PATENT DOCUMENTS 7,708,719 B2   5/2010 Wilmot et al.
8,640,889 B2   2/2014 Gasper et al.
(Continued)

FOREIGN PATENT DOCUMENTS

CN   101605700 A   12/2009
EP   2138148 A1 * 12/2009 .............. A61J 1/062
(Continued)

OTHER PUBLICATIONS

International Search Report of PCT/KR2020/003216, Jun. 12, 2020, English translation.

*Primary Examiner* — Anthony D Stashick
*Assistant Examiner* — Raven Collins
(74) *Attorney, Agent, or Firm* — STIP Law Group, LLC (57) ABSTRACT

The present invention relates to a container, which accommodates a drug and is sealed, includes a container stopper part including at least one filling groove formed in order to inject a drug, and a container body including an opening into which the container stopper part is inserted and which is sealed, wherein the filling groove is formed in an outer wall surface of the container stopper part in a longitudinal direction in which the container stopper part is inserted thereinto and forms a passage which is formed between the outer wall surface of the container stopper part and an inner wall surface of the container body and through which the drug is injectable.

3 Claims, 14 Drawing Sheets

(51) Int. Cl.
*B29D 22/00* (2006.01)
*C03B 19/02* (2006.01)

(58) Field of Classification Search
USPC .......................................... 206/530
See application file for complete search history.

(56) References Cited

U.S. PATENT DOCUMENTS

| | | | |
|---|---|---|---|
| 2010/0016824 A1* | 1/2010 | Palusci | B65D 47/02 |
| | | | 215/355 |
| 2015/0041498 A1 | 2/2015 | Kakiuchi et al. | |
| 2016/0030284 A1* | 2/2016 | Vedrine | A61J 1/1406 |
| | | | 53/440 |

FOREIGN PATENT DOCUMENTS

| | | | | |
|---|---|---|---|---|
| JP | H0775672 A | 3/1995 | | |
| JP | H0928797 A | 2/1997 | | |
| JP | 3117900 B2 | 12/2000 | | |
| JP | 2017522961 A | 8/2017 | | |
| KR | 20040005112 A | 1/2004 | | |
| KR | 20070044658 A | 4/2007 | | |
| KR | 20140124828 | * 10/2014 | ................ | A61J 1/06 |
| KR | 20140124828 A | 10/2014 | | |
| KR | 101521215 B1 | 5/2015 | | |

* cited by examiner

CONTAINER WHICH ACCOMMODATES DRUG AND IS SEALED

CROSS-REFERENCE TO RELATED APPLICATIONS

This application is the U.S. National Phase under 35 U.S.C. § 371 of International Application No. PCT/KR2020/003216 filed on Mar. 8, 2020, which in turn claims the benefit of Korean Application No. 10-2019-0030860 filed on Mar. 19, 2019, the disclosures of which are incorporated by reference into the present application.

TECHNICAL FIELD

The present invention relates to a container which accommodates a drug and is sealed, and to a container which is filled with a drug through a container stopper part including a filling groove to reduce a filling time, includes a curved portion to prevent a head portion from being separated from a container body when the container is stored and easily separate the head portion from the container body when the container is used, accommodates the drug, and is sealed.

BACKGROUND ART

Ampoules or vials are containers which may be formed of a glass or plastic material. In the case of an ampoule formed of the glass material, since a melting and sealing process of melting and sealing the mouth of the container is performed after the container is filled with a drug, many shards of glass are generated when a head portion of the ampoule is cut to be used, and thus there is an inconvenience in that the head portion should be cut through a predetermined method.

In an ampoule or vial formed of the plastic material in order to solve the above inconvenience, there is no problem of generating shards of glass, but the container formed of the plastic material has a problem of low productivity in a drug filling and sealing process when compared to the ampoule formed of the glass material.

U.S. Pat. No. 8,640,899 B2 relates to a vial which accommodates a predetermined amount of drug and includes a hole provided in a side surface of a stopper part to fill the vial with a drug and in which the side surface of the stopper part is press-inserted into a body part and moved to a seating portion, and although a cut portion is formed between a top portion of the stopper part and the seating portion, since the hole formed in the side surface of the stopper part should have a size smaller than a predetermined size in order for the drug to not flow out when the drug fills the vial, there is a problem in that an increase in the size of the hole to reduce a filling time is not allowed.

In addition, since there is a concern that the cut portion formed between the top portion of the stopper part and the seating portion is broken due to a force which acts in a longitudinal direction of the vial, there are problems in that caution is required when press-fitting of the stopper part and body part is performed after the vial is filled with the drug, and there is a high risk of damage even in a process of transporting the packaged vial.

Korean Laid-Open Patent Publication No. 10-2004-00005112 relates to a manufacturing apparatus and a method for a plastic ampoule. After a first coupling portion is removed, contents are filled through a liquid medicine inlet, and heat fusion is performed. Since sealing is not possible after the first coupling portion is removed in order to fill an ampoule with the contents, and the ampoule is filled with the contents, and before heat fusion is performed, it takes a lot of time to fill the ampoule with the contents, and since it is difficult to prevent contamination before heat fusion is performed, there is a problem in that productivity may be lowered.

Korean Laid-open Patent Publication No. 10-2007-0044658 relates to an ampoule and a method for manufacturing thereof. An additional cut line formed on an inlet in advance is cut, the inlet is opened, an injection liquid is injected, an upper end of the inlet is sealed using a mold, and since the inlet should be opened by cutting the cut line to fill an ampoule with contents, and the mold is needed to seal the inlet after the contents fill the ampoule, there are problems in that it takes a long time, and productivity may be lowered.

Korean Laid-Open Patent Publication No. 10-2007-0044658 relates to a safe ampoule for injection. Since an internal pressure of an ampoule formed of a glass material is lower than an external pressure, a protection member is provided on an outer circumferential surface of a cut portion to prevent shards of glass generated when the cut portion is broken from being introduced into a body portion, but there is still a problem in that the ampoule is difficult to handle during production or use because the glass material is easily broken.

Technical Problem

The present invention is directed to a container to be filled with a drug through a container stopper part in which a filling groove is provided, thereby reducing a filling time.

The present invention is also directed to a container provided with a curved portion to prevent a head portion from being separated from a container body when the container is stored or transported and to easily separate the head portion from the container body when the container is used.

Objectives to be solved by the present invention are not limited to the above-described objectives, and other objectives which are not clearly described above may be easily understood by those skilled in the art through the configuration and operation of the present invention.

Technical Solution

The present invention includes the following configuration to solve the objectives.

The present invention relates to a container, which accommodates a drug and is sealed, and includes a container stopper part including at least one filling groove formed in order to inject a drug, and a container body including an opening into which the container stopper part is inserted and which is sealed, wherein the filling groove is formed in an outer wall surface of the container stopper part in a longitudinal direction in which the container stopper part is inserted thereinto and forms a passage which is formed between the outer wall surface of the container stopper part and an inner wall surface of the container body and through which the drug is injectable.

The filling groove of the present invention may be formed in the outer wall surface of the container stopper part to have a semicircular shape in the longitudinal direction in which the container stopper part inserted thereinto.

A head portion connected to a side, which is opposite to a side in which the opening of the container body of the present invention is formed, through a cut portion may be provided, and the head portion is separable from the container body at the cut portion.

The cut portion connected to the head portion of the present invention may be formed on a curved portion of which a diameter gradually decreases from the container body.

The container stopper part of the present invention may include a first seating portion and a second seating portion which are inserted into the opening of the container body, and an outer diameter of the first seating portion may be formed to be smaller than an outer diameter of the second seating portion.

In the present invention, a groove may be formed in the outer wall surface of the container stopper part between the first seating portion and the second seating portion, a protrusion may be formed on the inner wall surface of the container body, when the container stopper part is inserted into the opening of the container body, and an end of the first seating portion of the container stopper part is caught on and in contact with the protrusion, the drug is injectable, and when the container stopper part is press-inserted into the opening of the container body, the end of the first seating portion of the container stopper part passes the protrusion, and the protrusion is seated on the groove formed between the first seating portion and the second seating portion, the container stopper part may seal the opening of the container body.

In addition, the present invention relates to a method of manufacturing a container which accommodates a drug and is sealed, and a container, which accommodates a drug and is sealed, is manufactured through injection molding.

In addition, the present invention relates to a manufacturing apparatus of a container which accommodates a drug and is sealed, and a container, which accommodates a drug and is sealed, is manufactured through injection molding.

Advantageous Effects

An effect of the present invention is that a container is filled with a drug through a container stopper part including a filling groove so that a filling time can be reduced.

Another effect of the present invention is that a container is provided with a curved portion to prevent a head portion from being separated from a container body when the container is stored and transported and easily separate the head portion from the container body when the container is used.

Effects of the present invention are not limited to the above-described effects, and other effects which are not clearly described above will be easily understood by those skilled in the art through a configuration and an operation of the present invention which will be described below.

MODES OF THE INVENTION

Hereinafter, the overall configuration and operations according to exemplary embodiments of the present invention will be described. Such embodiments do not restrict the overall configuration and operations, and a case in which other configurations and operations which are not clearly described in the embodiments are easily understood by those skilled through the embodiments of the present invention will be considered as the technical spirit of the present invention.

Generally, ampoules or vials are containers which may be formed of a glass or plastic material. In the case of an ampoule, since a melting and sealing process of melting and sealing the mouth of a container is performed after the container is filled with a drug, productivity may be increased. However, in a case in which a container body or container stopper part is formed of a plastic material, a method is needed to increase productivity in processes of filling a drug and sealing a container when compared to the ampoule formed of the glass material.

Figure 1:
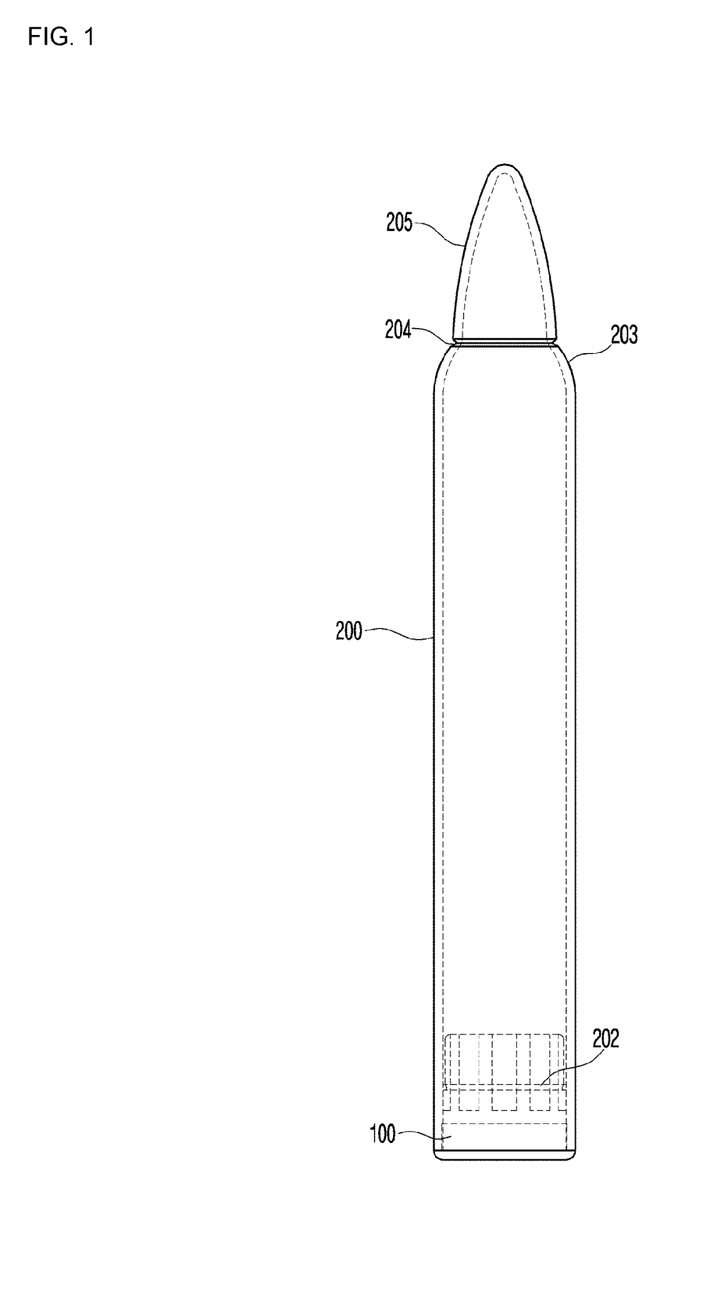
FIG. 1 is a side cross-sectional view illustrating a container which accommodates a drug and is sealed.

FIG. 1 is a side cross-sectional view illustrating a container which accommodates a drug and is sealed.

Referring to FIG. 1, the container, which accommodates a drug and is sealed, of the present invention includes a container stopper part 100 and a container body 200. A protrusion 202 is formed in the container body 200, a curved portion 203 is formed so that a head portion 205 is formed on a cut portion 204, and a state in which the container stopper part 100 seals the container body 200 is shown.

Figure 2:
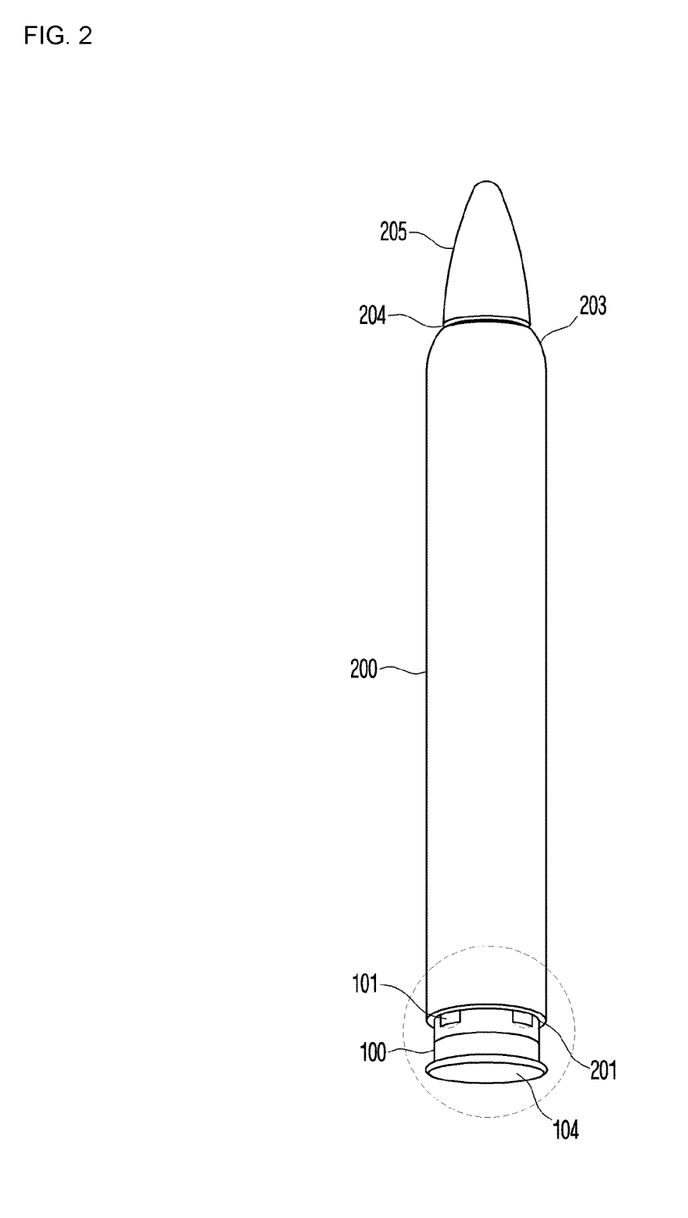
FIG. 2 is a view illustrating a shape of the container, which accommodates a drug and is sealed, of the present invention to be filled with a drug.
Figure 3:
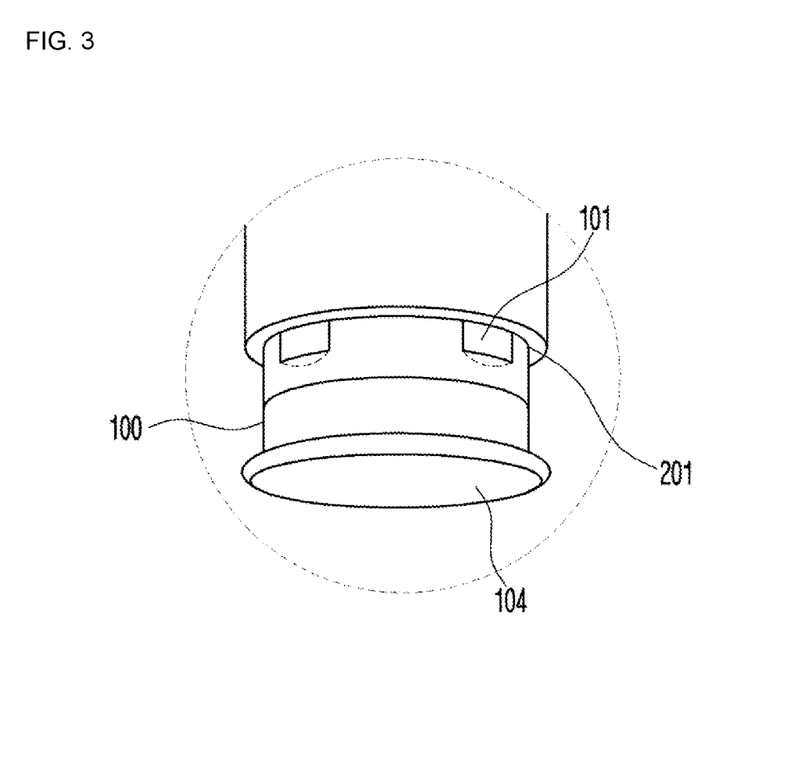
FIG. 3 is an enlarged view illustrating a container stopper part of the container, which accommodates a drug and is sealed, of the present invention.
Figure 4:
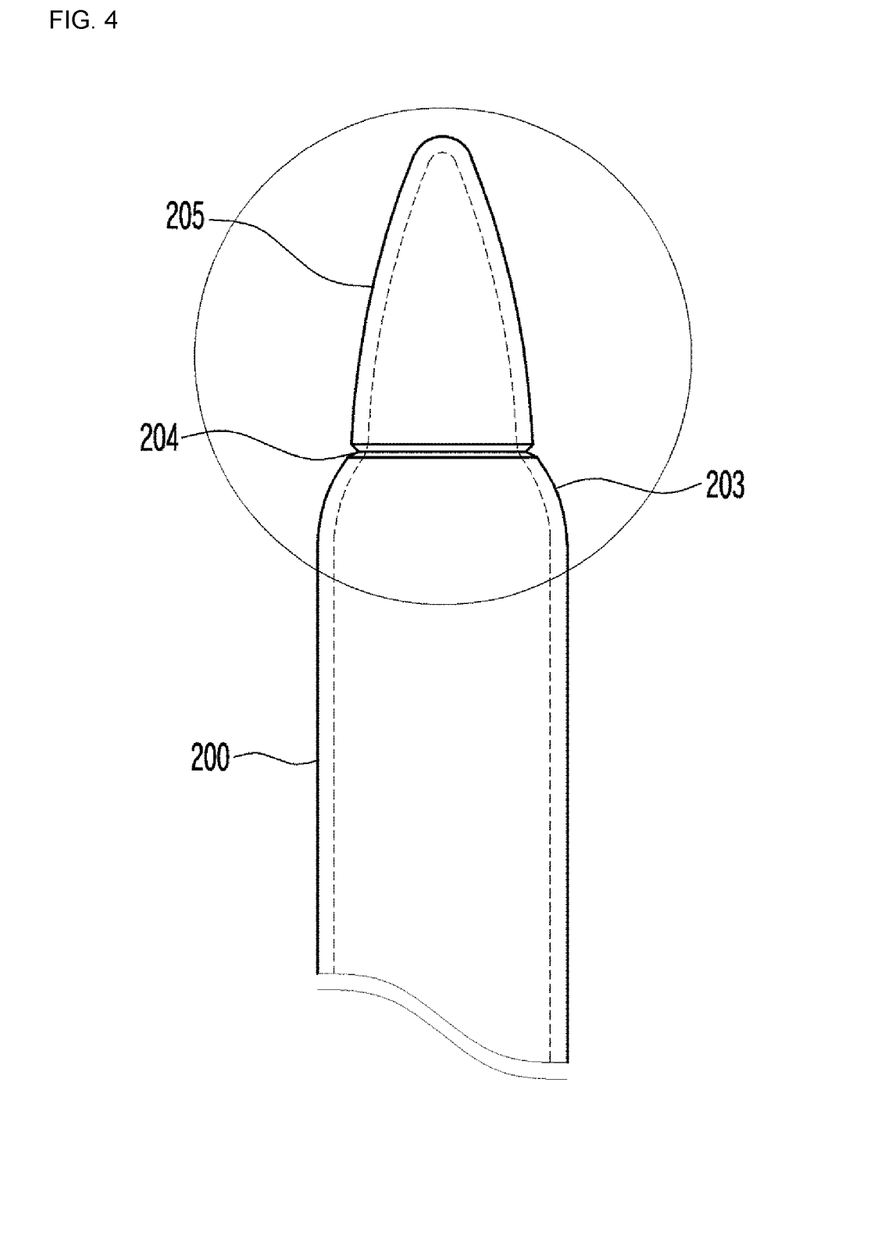
FIG. 4 is an enlarged view illustrating a head portion of the container, which accommodates a drug and is sealed, of the present invention.

FIG. 2 is a view illustrating a shape of the container, which accommodates a drug and is sealed, of the present invention to be filled with a drug, FIG. 3 is an enlarged view illustrating the container stopper part of the container, which accommodates a drug and is sealed, of the present invention, FIG. 4 is an enlarged view illustrating the head portion of the container, which accommodates a drug and is sealed, of the present invention.

Referring to FIGS. 2 and 3, a state in which the container stopper part 100 seals the container body 200 to accommodate a drug and a form in which the container stopper part 100 is inserted into an opening 201 of the container body 200 are shown, Filling grooves 101 formed in an outer surface of the container stopper part 100 form a passage through which the drug may enter an inner portion of the container body 200 from the outside even in the state in which the container stopper part 100 is inserted into the opening 201 of the container body 200, when the container body 200 is filled with a predetermined amount of the drug, the container stopper part 100 is moved further into and press-inserted into the container body 200 so that a cover part 104 is in contact with the opening 201.

Referring to FIGS. 2 and 4, in a case in which a user wants to use the drug filling the container body 200, the head portion 205 is separated from the container body 200 so that the drug flows from the container body 200.

In order to separate the head portion 205 from the container body 200 even using only a finger force of the user without using a particular tool to separate the head portion 205 from the container body 200, the cut portion 204 is formed between the head portion 205 and the container body 200.

Meanwhile, since the cut portion 204 is formed, the head portion 205 may be easily separated from the container body 200. However, the cut portion 204 may also be broken, and the drug may flow out when the container of the present invention is stored or transported.

In order to prevent such breakage, when the curved portion 203 is formed between the container body 200 and the cut portion 204, resistance against a force vertically applied from an upper side of the container body 200 may be increased.

More specifically, as a large number of containers in which drugs are accommodated are packed in a box and a large number of boxes may be stored or transported, there is a case in which the boxes are stacked in several layers when stored or transported, and in this case, when a force vertically applied from the upper side of the container body 200 is increased to a certain magnitude, the cut portion 204 may be broken, and the drug may flow from the container.

As a result, when the curved portion 203 is formed between the container body 200 and the cut portion 204, the resistance against the force vertically applied from the upper side of the container body 200 can be increased, and the user can easily separate the head portion 205 from the container body 200 in a case in which the user applies a force in a diameter direction of the container body 200 to use the drug filling the container body 200.

Figure 5A:
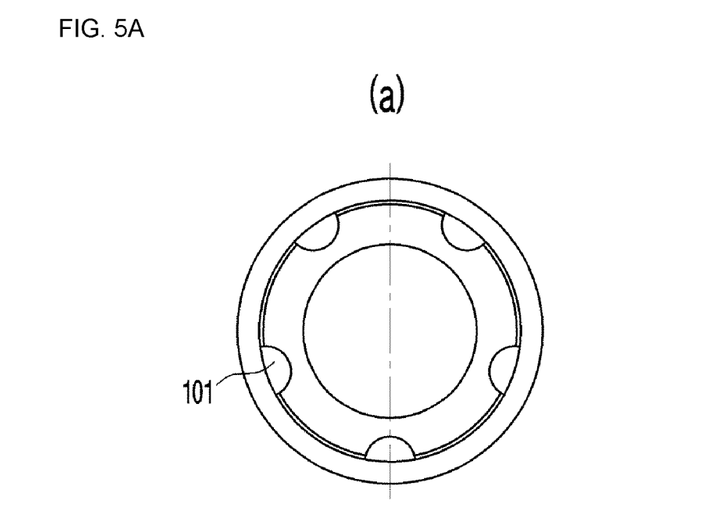
FIG. 5A, FIG. 5B, and FIG. 5C are top, side, and bottom views illustrating the container stopper part of the container, which accommodates a drug and is sealed, of the present invention.
Figure 5B:
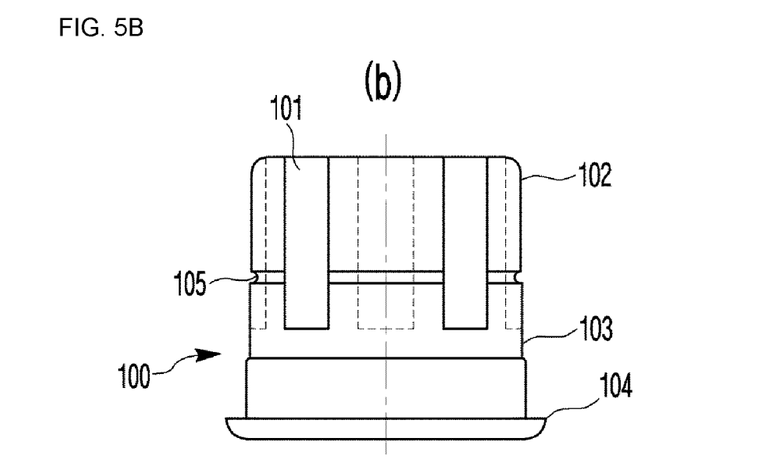
Figure 5C:
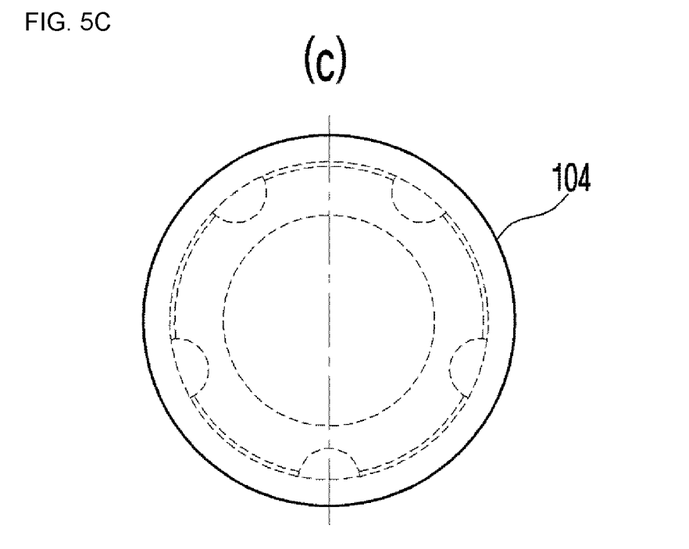
Figure 6:
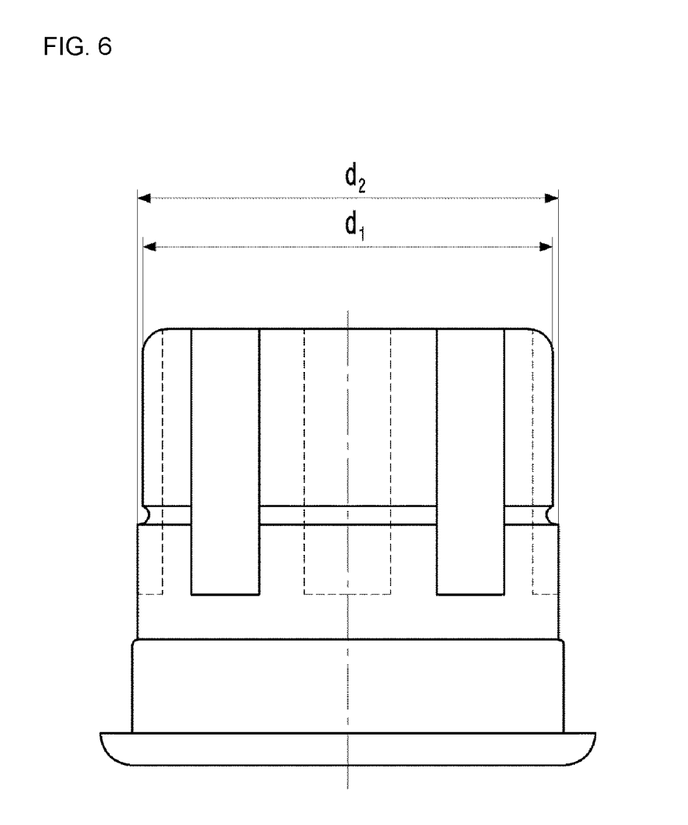
FIG. 6 is a view illustrating specific dimensions of the container stopper part of the container, which accommodates a drug and is sealed, of the present invention.

FIGS. 5A, 5B, and 5C are top, side, and bottom views illustrating the container stopper part of the container, which accommodates a drug and is sealed, of the present invention, and FIG. 6 is a view illustrating specific dimensions of the container stopper part of the container, which accommodates a drug and is sealed, of the present invention.

Referring to FIGS. 5A, 5B, and 5C, in the container stopper part 100 of the present invention, a first seating portion 102 and a second seating portion 103 which are pushed into the container body 200 are formed, and a diameter of the cover part 104 is formed to be greater than a diameter of the second seating portion 103 so that the container stopper part 100 is inserted into and seals the container body 200 and the cover part 104 is in contact with the opening 201.

In addition, the filling grooves 101 are formed in an outer wall surface of the container stopper part 100, five filling grooves 101 are formed to have a semicircular shape as shown in FIG. 5A and formed in the first seating portion 102 and the second seating portion 103 as shown in FIG. 5B. The plurality of filling grooves 101 may be formed in the outer wall surface of the container stopper part 100, since a filling speed may be significantly improved when filling the container with the drug, an increase in productivity can be expected, and in a case in which the container stopper part 100 is manufactured through injection molding, since a mold may be simplified, manufacturing costs can be reduced.

When a cross-sectional area of the filling groove 101 formed to have the semicircular shape is greater than a predetermined area, since the drug may not stay in the container and may flow out of the container after the container is filled with the drug in a vacuum filling method, it is difficult to perform a subsequent sealing process.

As a result, the cross-sectional area of the filling groove 101 should be smaller than the predetermined area, but as the cross-sectional area of the filling groove 101 decreases, a filling speed may decrease when filling the container with the drug. Therefore, in the present invention, the plurality of filling grooves 101 may be formed in the outer wall surface of the container stopper part 100 and thus the filling speed can increase due to all of the plurality of filling grooves 101.

In addition, a groove 105 is formed between the first seating portion 102 and the second seating portion 103, and the groove 105 is a part in which the protrusion 202 formed on an inner wall of the container body 200 is seated. The groove 105 will be described in detail in the description about FIG. 7.

Referring to FIG. 6, the container stopper part 100 includes the first seating portion 102 and the second seating portion 103 which are inserted into the opening of the container body 200, and an outer diameter d1 of the first seating portion 102 is formed to be smaller than an outer diameter d2 of the second seating portion 103.

Figure 7A:
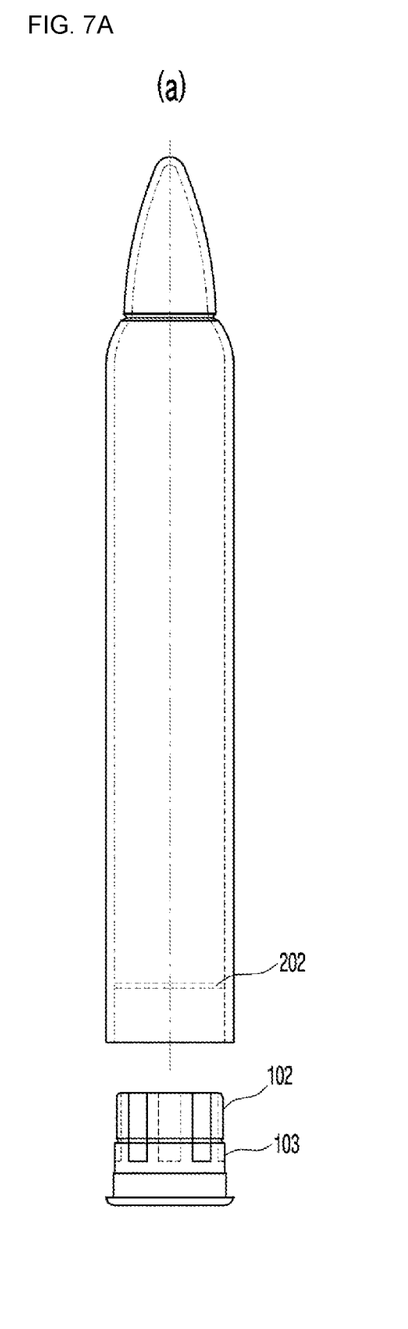
FIG. 7A, FIG. 7B, and FIG. 7C, are views illustrating a process in which the container, which accommodates a drug and is sealed, of the present invention is filled with a drug and sealed according to a position of the container stopper part.
Figure 7B:
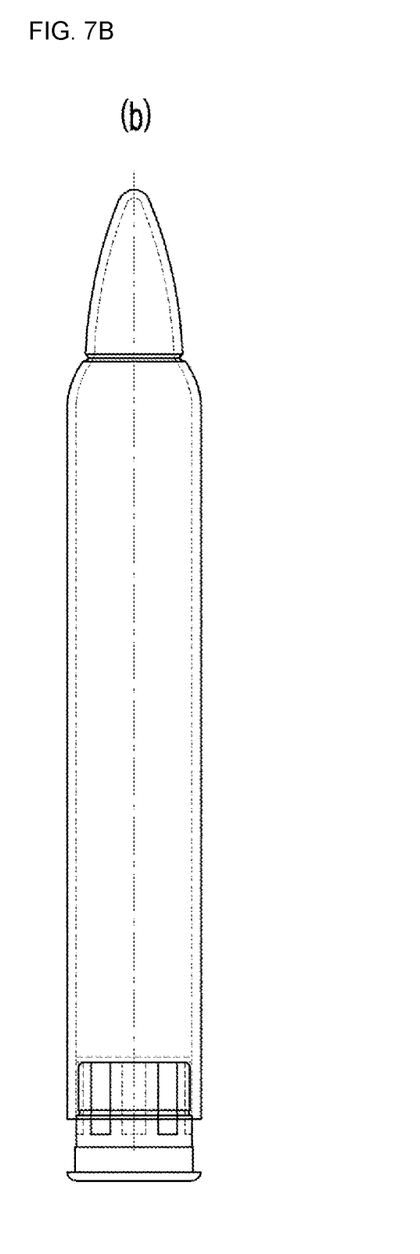
Figure 7C:
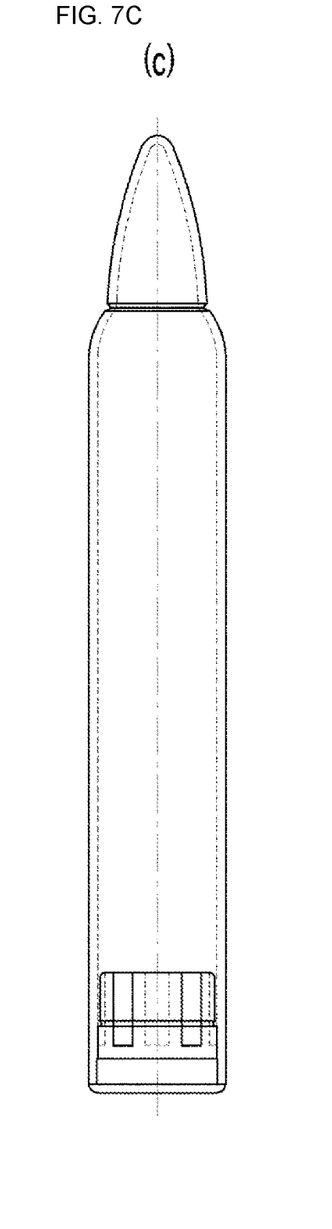
Figure 8:
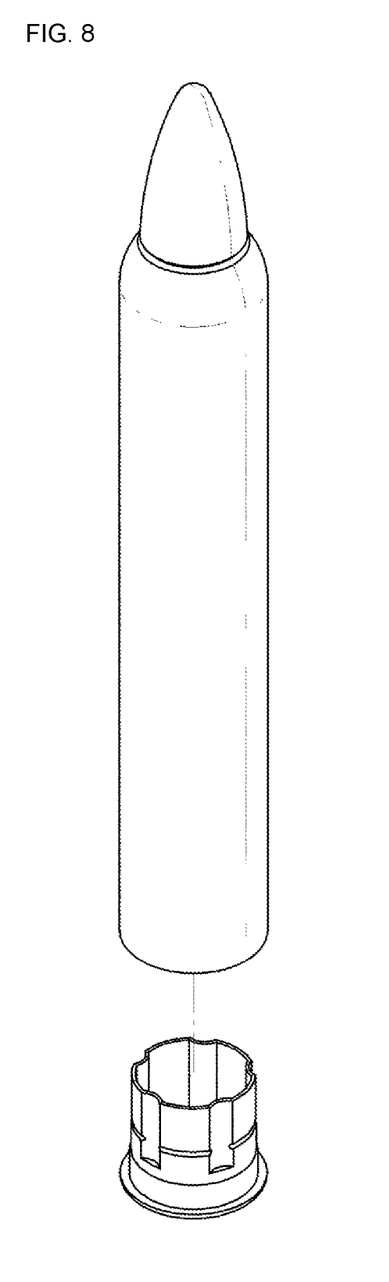
FIG. 8, FIG. 9, FIG. 10 and FIG. 11 are views illustrating various examples of a container stopper part of the present invention according to a shape thereof.
Figure 9:
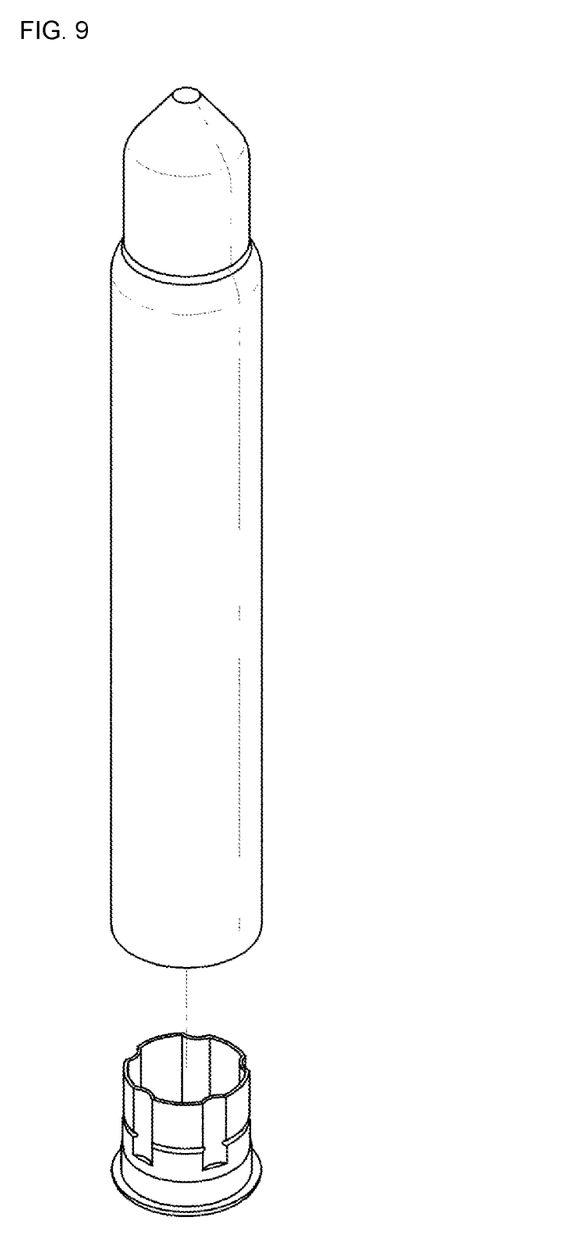
Figure 10:
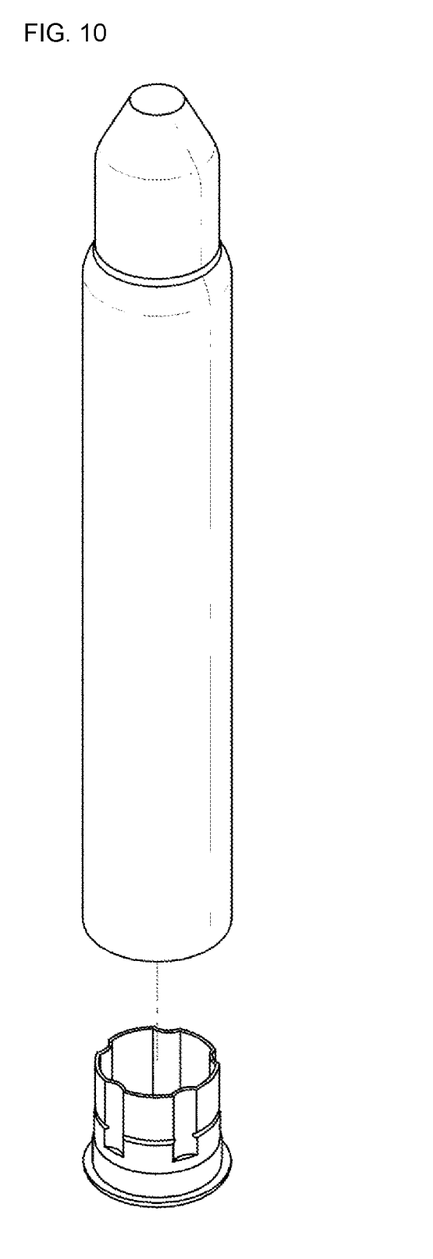
Figure 11:
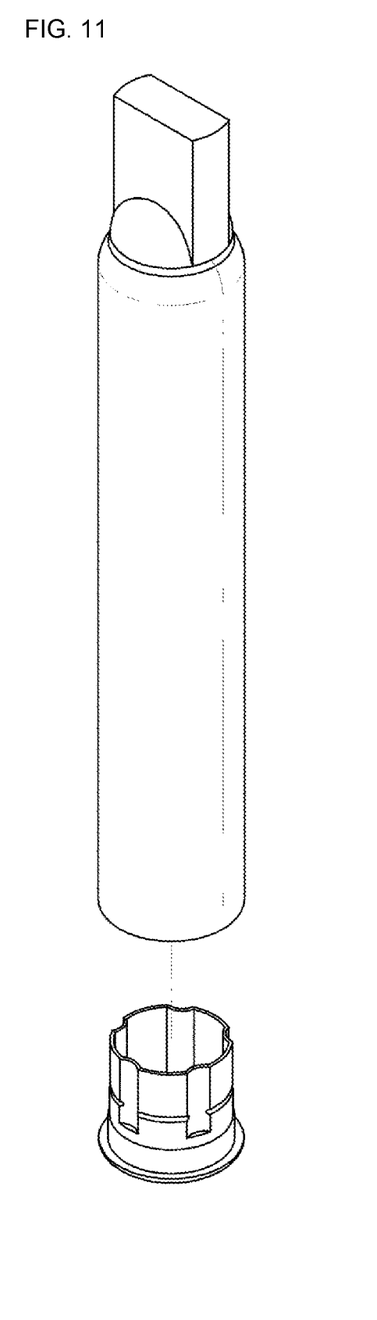

FIGS. 7A, 7B, and 7C, are views illustrating a process in which the container, which accommodates a drug and is sealed, of the present invention is filled with a drug and sealed according to a position of the container stopper part.

Referring to FIGS. 7A, 7B, and 7C, FIG. 7A shows a state in which the container stopper part 100 is separated from the container body 200, FIG. 7B shows a state in which the container stopper part 100 is combined with the container body 200, the first seating portion 102 is inserted into the container body 200 through the opening 201 of the container body 200 so that an end of the first seating portion 102 is in contact with the protrusion 202 formed on the inner wall of the container body 200, and an end of the second seating portion 103 is positioned in the opening 201 of the container body 200.

The container may be filled with the drug in an operation of filling the drug illustrated in FIG. 7B through a vacuum filling method, and after the filling is completed, as illustrated in FIG. 7C, the second seating portion 103 of the container stopper part 100 is press-inserted into the container body 200 through the opening 201 of the container body 200, the first seating portion 102 passes the protrusion 202 and further enters the inner portion of the container body 200, and the protrusion 202 formed on the inner wall of the container body 200 is seated in the groove 105 formed between the first seating portion 102 and the second seating portion 103 of the container stopper part 100.

As illustrated in FIG. 7C, after the container stopper part 100 is completely press-inserted into the container body 200, fusion may be performed, an outer portion of the container is cleaned, and post-sterilization is performed.

In addition, the container stopper part 100 and the container body 200 of the present invention may be manufactured through injection molding, a cross section thereof may be formed to have an oval or track shape, but it is preferable that the cross section be formed to have a circular shape in order to effectively arrange and handle the plurality of containers in a process of filling the drug and cleaning.

FIGS. 8 to 11 are views illustrating various examples of a container stopper part of the present invention according to a shape thereof.

Referring to FIGS. 8 to 11, a shape of a head portion 205 of the present invention may be variously formed to easily separate the head portion 205 from a container body 200, and a method of easily separating the head portion 205 from the container body 200 or content displaying visual beauty may be displayed.

REFERENCE NUMERALS

100: CONTAINER STOPPER PART
101: FILLING GROOVE
102: FIRST SEATING PORTION
103: SECOND SEATING PORTION
104: COVER PART
105: GROOVE
200: CONTAINER BODY
201: OPENING
202: PROTRUSION
203: CURVED PORTION
204: CUT PORTION
205: HEAD PORTION

The invention claimed is:

1. A container which accommodates a drug and is sealed, the container comprising:
   a container stopper part including at least one filling groove formed in order to inject a drug; and
   a container body including an opening into which the container stopper part is inserted and which is sealed, wherein,
   the filling groove does not form an orifice that penetrates the outer wall of the container stopper part and is formed as a groove in an outer wall surface of the container stopper part in a longitudinal direction in which the container stopper part is inserted thereinto such that a passage is formed between the outer wall surface of the container stopper part and an inner wall surface of the container body and the drug is injectable through the passage,
   the container stopper part includes a first seating portion and a second seating portion which are inserted into the opening of the container body,
   an outer diameter of the first seating portion is formed to be smaller than an outer diameter of the second seating portion,
   a head portion connected to a side, which is opposite to a side in which the opening of the container body is formed, through a cut portion is provided, and
   the head portion is separable from the container body at the cut portion,
   a groove is formed in the outer wall surface of the container stopper part between the first seating portion and the second seating portion;
   a protrusion is formed on the inner wall surface of the container body;
   when the container stopper part is inserted into the opening of the container body and an end of the first seating portion of the container stopper part is caught on and in contact with the protrusion, the drug is injectable; and
   when the container stopper part is press-inserted into the opening of the container body, the end of the first seating portion of the container stopper part passes the protrusion, and the protrusion is seated on the groove formed between the first seating portion and the second seating portion, the container stopper part seals the opening of the container body.

2. The container of claim 1, wherein the filling groove is formed in the outer wall surface of the container stopper part to have a semicircular shape in the longitudinal direction in which the container stopper part is inserted thereinto.

3. The container of claim 2, wherein the cut portion connected to the head portion is formed on a curved portion of which a diameter gradually decreases from the container body.

* * * * *